(12) United States Patent
Cheriton

(10) Patent No.: US 9,274,948 B1
(45) Date of Patent: *Mar. 1, 2016

(54) HARDWARE-PROTECTED REFERENCE COUNT-BASED MEMORY MANAGEMENT USING WEAK REFERENCES

(71) Applicant: David R. Cheriton, Palo Alto, CA (US)

(72) Inventor: David R. Cheriton, Palo Alto, CA (US)

(73) Assignee: David R. Cheriton, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,046

(22) Filed: Aug. 11, 2014

Related U.S. Application Data

(63) Continuation of application No. 12/804,900, filed on Jul. 29, 2010, now Pat. No. 8,838,656.

(60) Provisional application No. 61/273,177, filed on Jul. 31, 2009.

(51) Int. Cl.
*G06F 17/30* (2006.01)
*G06F 12/02* (2006.01)

(52) U.S. Cl.
CPC ...... *G06F 12/0261* (2013.01); *G06F 17/30504* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,560,003 A | * | 9/1996 | Nilsen | G06F 12/0269 |
| 5,960,087 A | * | 9/1999 | Tribble | G06F 12/0261 380/30 |
| 6,473,773 B1 | * | 10/2002 | Cheng | G06F 9/4428 707/814 |
| 7,519,640 B1 | * | 4/2009 | Garthwaite | G06F 12/0261 |
| 2009/0125548 A1 | * | 5/2009 | Moir | G06F 9/52 |
| 2009/0222799 A1 | * | 9/2009 | Stewart | G06F 8/72 717/143 |
| 2010/0241675 A1 | * | 9/2010 | Young | G06F 9/4428 707/815 |

* cited by examiner

*Primary Examiner* — Shyue Jiunn Hwa
(74) *Attorney, Agent, or Firm* — Van Pelt, Yi & James LLP

(57) ABSTRACT

A method for managing memory, comprising: maintaining a strong reference count for a first object; establishing a first reference from the first object to a second object; establishing a second reference from the second object to the first object, wherein the second reference is a weak reference that does not increase the strong reference count of the first object; detecting that the strong reference count of the first object has reached zero; in response to detecting that the strong reference count has reached zero, invoking a corresponding action.

23 Claims, 8 Drawing Sheets

| ... | strongReference Count = 1 | pRef = null | hasBackRef = false | WRDList = 0 | ... | A

| ... | strongReference Count = 1 | pRef = null | hasBackRef = false | WRDList = 0 | ... | B

FIG. 2A

| ... | strongReference Count = 1 | reference = addrB isReference = true isStrongReference = true | hasBackRef = true | level = 1 | ... | A addrA, offsetX

| ... | strongReference Count = 2 | reference = addrA isReference = true isStrongReference = false | hasBackRef = false | level = 2 | ... | B addrB, offsetY

FIG. 2B

| ... | strongReference Count = 1 | reference = addrB isReference = true isStrongReference = false | hasBackRef = true | level = 1 | ... | A addrA, offsetX

| ... | strongReference Count = 1 | reference = addrA isReference = true isStrongReference = false | hasBackRef = true | level = 1 | ... | B addrB, offsetY

FIG. 2C

HARDWARE-PROTECTED REFERENCE COUNT-BASED MEMORY MANAGEMENT USING WEAK REFERENCES

CROSS REFERENCE TO OTHER APPLICATIONS

This application is a continuation of co-pending U.S. patent application Ser. No. 12/804,900, entitled HARDWARE-PROTECTED REFERENCE COUNT-BASED MEMORY MANAGEMENT USING WEAK REFERENCES filed Jul. 29, 2010 which is incorporated herein by reference for all purposes, which claims priority to U.S. Provisional Patent Application No. 61/273,177 entitled WEAK REFERENCE MANAGEMENT FOR HARDWARE-PROTECTED CYCLE-FREE REFERENCE COUNT-BASED MEMORY RECLAMATION filed Jul. 31, 2009 which is incorporated herein by reference for all purposes.

BACKGROUND OF THE INVENTION

Memory reclamation is a key issue for computer systems. It is often difficult to implement memory reclamation correctly and efficiently. As computer hardware moves to provide increasing amounts of memory and increasing numbers of processors, memory reclamation is becoming an even greater concern, given the large amount of resources to be managed and the higher degree of concurrency in modern processor architectures.

Conventionally, memory reclamation is performed "manually" by the programmer, who explicitly specifies a memory release action in the program code. This approach leads to significant development cost as well as complex and difficult-to-diagnose errors.

In response, automatic reclamation techniques are developed. Some automatic reclamation techniques are based on scanning memory for unreferenced objects. One common approach is referred to as a tracing or "mark and sweep" approach. The technique becomes increasingly expensive as the size of main memory grows because the running time for performing a "mark and sweep" action increases, creating more interference with application progress, and often causing long pauses. This approach also makes the time to reclaim memory unpredictable, making it difficult to determine the amount of physical memory required to satisfy application requirements.

Alternatively, automatic reclamation may be based on maintaining a reference count per object and freeing the object when the reference count goes to zero, which indicates that there are no other references to this object. This approach, however, cannot reclaim memory when there is a cycle in the references. For example if object A points to object B and object B also points to object A, then A has a non-zero reference count independent of whether there are any other references to A; similarly, B also has a non-zero reference count. Thus, neither A nor B is ever reclaimed even though neither is reachable from the rest of the application. Some improved techniques combine mark and sweep with reference counting; however, these techniques tend to be inefficient and complex.

BRIEF DESCRIPTION OF THE DRAWINGS

Various embodiments of the invention are disclosed in the following detailed description and the accompanying drawings.

FIGS. 2A-2D are data structure diagrams illustrating examples of setting the reference relationships between objects and the corresponding fields.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Memory management using hardware-protected references is disclosed. In the embodiments described, software accesses memory through hardware-protected references. In the embodiments described below, physical components (including electrical, electronic, optical, optoelectronic, etc.) as well as protected firmware executing on certain physical components are collectively referred to as hardware, and program code executing on one or more computer processors is referred to as software.

Figure 1A:
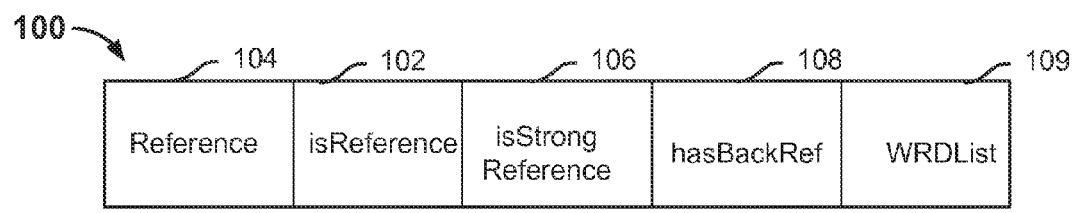
FIG. 1A is a diagram illustrating an embodiment of a basic data structure that supports hardware-protected references.

FIG. 1A is a diagram illustrating an embodiment of a basic data structure that supports hardware-protected references. In this example, datum 100 includes an isReference field 102. A reference field 104 that is set in the event that isReference is set to true, an isStrongReference field 106, a hasBackRef field 108, and a WRDList 109 are optionally included. The locations of the fields may vary depending on implementation and the datum may include additional fields and information.

In the example shown, the isReference field is a Boolean tag indicating whether the datum is associated with a hardware-protected reference (also referred to as a hardware-protected pointer or hardware-protected handle). If isReference is true, the hardware-protected reference is stored in the reference field. The hardware-protected reference can be null or can point to an allocated segment of memory. A datum with non-null reference further includes an isStrongReference field, which is a Boolean tag indicating whether the reference is a strong reference or a weak reference. A strong reference affects the reference count of the object to which the strong reference refers, and a weak reference does not affect the reference count. As will be described in greater detail below, strong and weak references facilitate automatic memory reclamation by eliminating reference cycles where two unused objects maintain non-zero reference count because they refer to each other. The hasBackRef field is also a Boolean tag. In some cases, an object referred to by this object may have a reference that refers back to this object, and the hasBackRef field is set to true. In some embodiments, the WRDList field represents a list of weak reference descriptors (WRDs) used to track the weak references made by this object to other objects. The purpose of the WRDList is described in greater detail below.

Figure 1B:
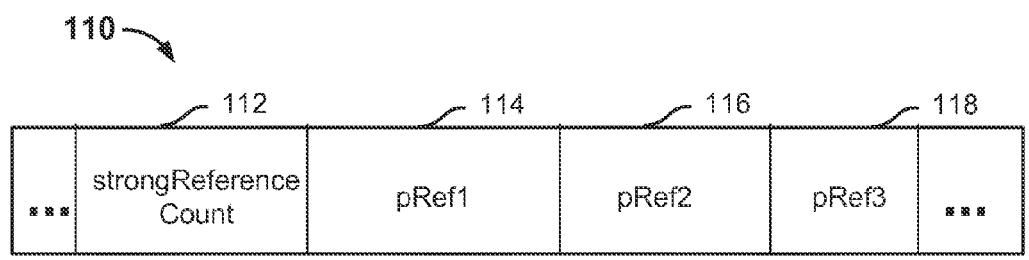
FIG. 1B is a data structure diagram illustrating an embodiment of an object structure that supports hardware-protected references.

FIG. 1B is a data structure diagram illustrating an embodiment of an object structure that supports hardware-protected references. In this example, object 110 includes a single strongReferenceCount field 112 and one or more pRef fields. Three pRef entries are shown in the example. Each pRef field represents a hardware-protected reference that has the format of datum 100. The object may also include additional fields and data specific to the object itself (not shown).

The strongReferenceCount field tracks the number of strong references from other objects to this object. The object is deallocated when all strong references to this object are changed to null or to another object. In other words, the object is ready to be deallocated when strongReferenceCount decreases to 0. If the object includes one or more hardware-protected reference fields, each reference field is set. In some embodiments, the reference field is a datum with isReference field set to true.

In the event that an object (the referencing object) makes a strong reference to another referenced object, there is a possibility that the referenced object would make a reference back to the referencing object. In a conventional reference counting scheme, each object would have a non-zero reference count, therefore a reference cycle is formed and both objects are prevented from being reclaimed. In some embodiments according to this invention, however, the hardware prevents two objects from having strong references to each other and ensures that the back reference from the referenced object to the referencing object is always a weak reference that does not increase the referencing object's reference count. In other words, when two objects reference each other, the references can be a strong-weak pair or a weak-weak pair, but a strong-strong pair is prohibited. This way, automatic memory reclamation can collect objects that refer to each other but are not referred to by other objects. The hasBackRef field in the object's pRef field is used to indicate whether the referenced object has a back reference to this object (i.e., whether there is a weak reference paired with referencing object's strong reference).

To deallocate an object whose strongReferenceCount has reached zero, its weak references should be cleared. A number of techniques for locating the weak references are described in greater detail below. In some embodiments, a list of weak reference descriptors (WRDs) is used to track the weak references made by this object to other objects. When an object is ready to be deallocated, the weak references referencing to it are set to null, and the corresponding weak reference descriptors are deleted or modified. In some embodiments, pointers and/or offsets are used to locate the weak references instead of the WRDs.

Figure 1C:
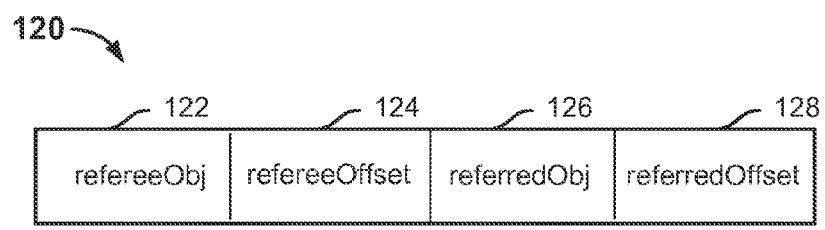
FIG. 1C is a data structure diagram illustrating an embodiment of a weak reference descriptor (WRD).

FIG. 1C is a data structure diagram illustrating an embodiment of a weak reference descriptor (WRD). The WRD provides an indirect weak reference between two objects. For example, if an object B requires a weak reference to object A, a WRD 120 is allocated and initialized as follows: refereeObj 122 corresponds to a reference to object B (e.g., a pointer to object B), refereeOffset 124 corresponds to the offset of the field in object B that has a reference to this WRD, referredObj 126 corresponds to a reference to object A, and referredOffset 128 corresponds to the offset of the field in object A referencing this WRD. In some embodiments, the offsets are predetermined using a fixed value or a programmed value. The offset fields in the WRD can therefore be repurposed as flags indicating that predetermined offsets are used. In some embodiments, additional fields are included in the WRD, such as action that is invoked on callback. Thus, a WRD can also serve as a listener object as described below in connection with FIG. 4.

FIGS. 2A-2D are data structure diagrams illustrating examples of setting the reference relationships between objects and the corresponding fields.

In FIG. 2A, objects A and B have the object data structure described in the example above. Both objects include protected pointers. Currently, the objects do not point to each other. Both objects have a strongReferenceCount of 1 because each is referenced to by another object (not shown), such as an object that created A or B. Also, in this example, A and B are assigned to different hierarchical levels when they are created. In some embodiments, the value of the hierarchical level of an object is one level higher than the parent that created it; for example, an assigned hierarchical level may be set as the level of its parent object plus 1. The hierarchical level can be adjusted as needed.

In FIGS. 2B-2C, A and B reference each other directly. As will be described in greater detail below, the hardware prevents two objects from making strong references to each other and requires two references between two objects that refer to each other to be either a strong-weak pair or a weak-weak pair. Whether two objects should form a pair of strong-weak references or a pair of weak-weak references depends on the application and may be specified in software code as required by the application.

In FIG. 2B, A makes a strong reference to B (indicated by a solid arrow) and B makes a weak reference to A (indicated by a dashed arrow). In this example, the referring object A has a lower numerical value (e.g., 1) than the referred object B (e.g., 2). The hierarchical levels are used to prevent two objects from making strong references to each other. In this example, an object at a higher numerical level is prevented from making a strong reference to another object at a lower numerical level. Since B is at level 2 and A is at level 1, B is only allowed to make a weak reference to A. Accordingly, B's strongReferenceCount is incremented and hasBackRef fields do not change, while A's strongReferenceCount does not change and hasBackRef field is set to true. Since in some embodiments the levels of the objects are assigned at the time they are instantiated, the levels can be adjusted should a conflict arise. For example, if A's hierarchical level is greater than B's initially, the hierarchical levels of A and/or B can be adjusted at the time the strong reference is made from A to B, such that A's level has a lower value than B's, thus preventing B from making a strong reference to A.

In some embodiments, to ensure that a pair of strong-weak references is always made together, the hardware stores the references in the same instruction or instruction sequence. For example, the hardware may be designed to support a store instruction (e.g. hasBackRefStore instruction) with the following operands: refereeObj that corresponds to the address of the object that makes the weak reference (e.g., the address of object B, addrB); referreeOffset that corresponds to the offset of the address of the weak reference within the object (e.g., offsetY); a referredObj that corresponds to the address of the object that is referenced by the weak reference (e.g., the address of object A, addrA), and a referredOffset that corresponds to the offset of the reference field in the referred object that makes the corresponding strong reference (e.g., offsetX). The instruction writes the addresses of A and B to the reference fields of B and A, respectively, increments B's strongReferenceCount, and sets their isStrongReference tags to appropriate values.

In the event that an existing reference in A that currently refers to C should be reset to refer to B, in some embodiments, the hasBackRefStore instruction determines whether C includes a back reference to A. If so, the back reference is cleared before the reference is reset. In some embodiments, the hasBackRefStore instruction requires the references to be initialized to null, therefore a reference that has an initial non-null value will cause the instruction to fail. In some embodiments, if the referredObj operand is null and the existing reference in A refers to C, then the back reference field at the referredOffset in C is set to null as part of this instruction execution to clear C's reference.

Assuming that at a later point the object that previously had a strong reference to A no longer references A. Thus, A's strongReferenceCount decreases to 0. The hardware detects this and traps to invoke software processing that either preserves A by increasing A's strong reference count by making at least one strong reference to A and incrementing the strongReferenceCount, or clears the weak reference in each object with a back reference to A and then deallocates A.

To clear the weak references upon detecting that the strong reference count of the object has reached 0, the weak references should be located. Several ways to locate the weak references are used in various embodiments, either individually or in combination. In some embodiments, hardware-protected references with hasBackRef field set to true are identified, and objects referenced by the hardware-protected references (that is, objects containing weak back references) are scanned to identify their respective weak references. Referring to the example shown in FIG. 2B, when the strong reference count of A reaches 0, the hardware-protected reference with hasBackRef set to true points to B. The hardware scans B, identifies the location of the weak reference within B that refers to A, and clears this weak reference. In some embodiments, the offsets of fields that may contain weak references are preset (either programmatically or fixed), thus the hardware can directly access these offset locations and check for any weak reference that may need to be cleared. In some embodiments, the weak references are located using WRDs, details of which are described below.

In FIG. 2C, A and B make weak references to each other (indicated by dashed arrows). Weak-weak reference pairs may be used to support certain data patterns and applications, such as the cache directory described below. In this example, the strongReferenceCount fields for both objects remain at 1 since each object is strongly referenced by one other object (not shown). In some embodiments, a store instruction similar to hasBackRefStore is used, which sets both the pRef field in A and the pRef field in B simultaneously. The instruction is also used when one of the objects should be deleted. For example, if A should be deleted because its strongReferenceCount has reached 0, and the pRef field in A is set to null, the instruction also sets pRef field of B to null. Since both references are weak, objects A and B can have the same hierarchical level or A can have a level greater than that of B.

In the event that A's strongReferenceCount reaches zero, in some embodiments, A's strongReferenceCount is increased by the software code to preserve A; in some embodiments, B is located via the weak reference included in A so that B's weak reference to A can be removed and A can be deleted.

Figure 2D:
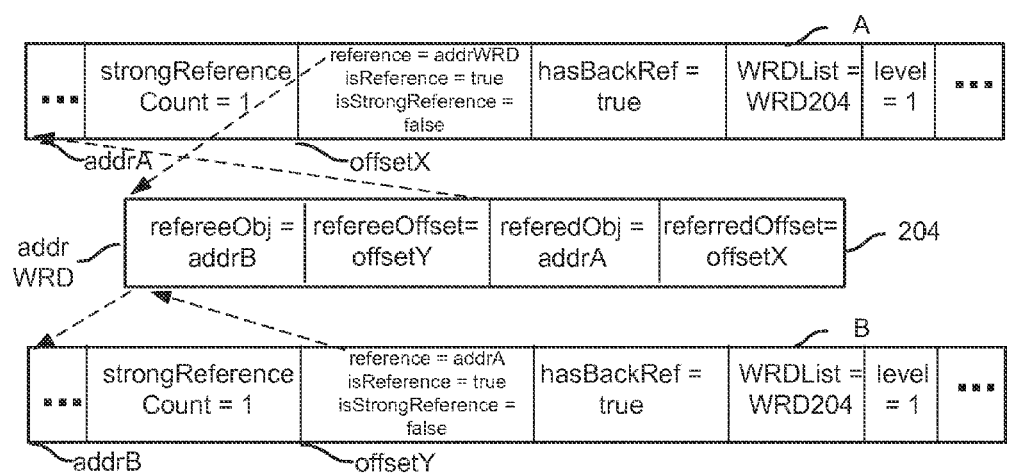

In FIG. 2D, A and B reference each other indirectly. In this example, a weak reference descriptor (WRD) 202 is optionally created to provide an indirect weak reference between two objects. The WRD may be created as a part of the hasBackRefStore instruction. In this example, A makes a strong reference to B and B makes a weak reference to A. Both references are made via WRD 204, which is added to the WRDLists of both objects A and B. The WRD has the following fields: refereeObj that corresponds to the address of the object that makes the weak reference (e.g., pointer/address to object B, addrB); referreeOffset that corresponds to the offset of the address of the WRD within the object (e.g., offsetY), a referredObj that corresponds to the address of the object that is referenced by the WRD (e.g., addrA), and a referredOffset that corresponds to the offset of the field in the referred object referencing this WRD (e.g., offsetX). The WRDLists of both A and B are updated to include this WRD to facilitate object access and deallocation. For example, object B can access object A via a weak reference by using its field that points to the WRD to access the referredObj field in the WRD to get a pointer to object A. The WRDLists can store additional WRDs associated with other weak references.

Since a WRDList is included in the object and the format of the WRD is known to the hardware, to locate the weak references used in the embodiments shown, the hardware can locate the refereeObj in each WRD and access the corresponding weak reference location to clear the weak reference to object. In the event that the strongReferenceCount of an object that includes a weak reference decreases to 0, the callback action either increases the strongReferenceCount to preserve the object, or locates the corresponding referenced object via the WRD and clears the weak reference.

Figure 3:
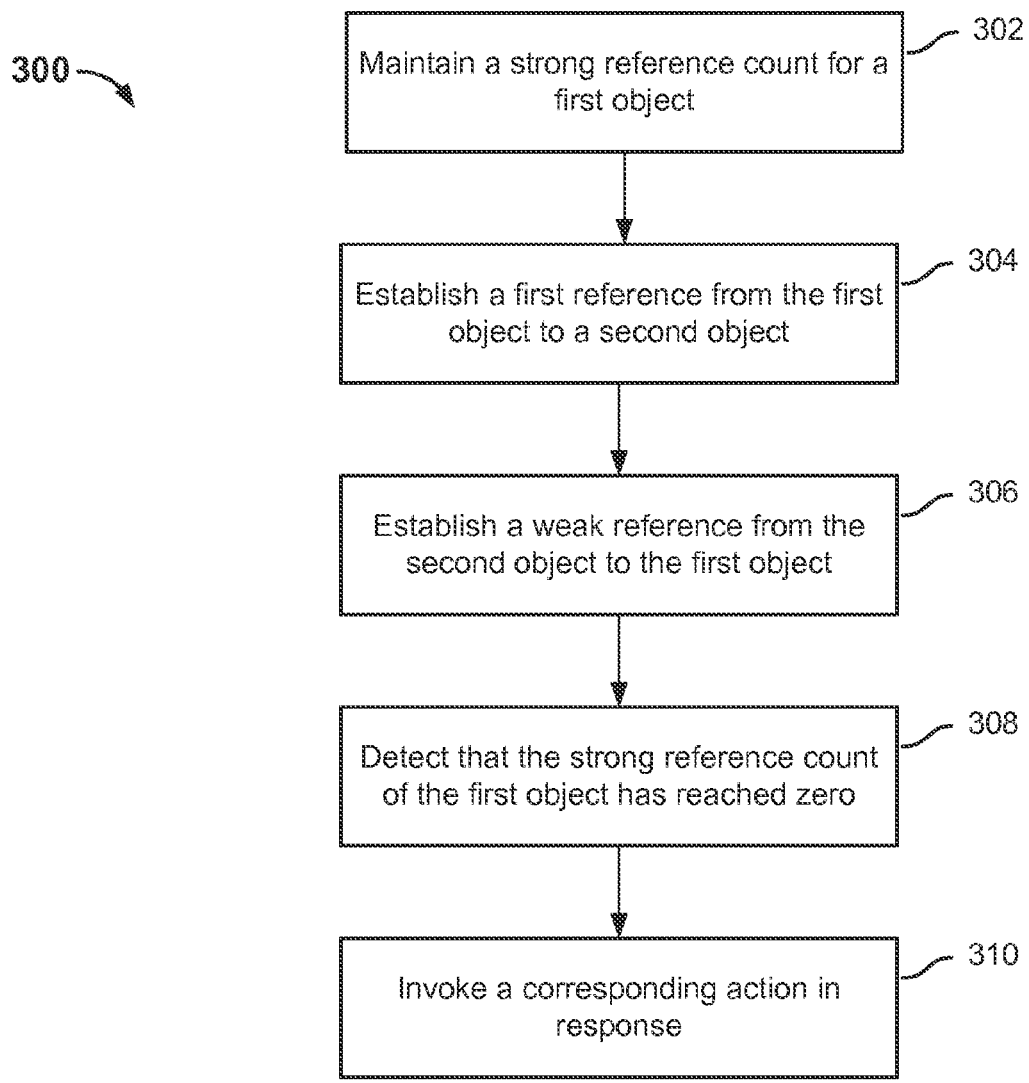
FIG. 3 is a flowchart illustrating an embodiment of a process for managing memory.

FIG. 3 is a flowchart illustrating an embodiment of a process for managing memory. Process 300 may be implemented on a processor that supports hardware-hardware-protected references. It is assumed that the objects have data structures similar to what was described above. At 302, a strong reference count for a first object (e.g., object A in the example above) is maintained. The strong reference count is incremented every time another object (e.g., object C or the main loop) to which the first object makes no reference makes a reference to the first object (e.g., object C has a non-cyclical reference to A). The strong reference count is decremented when such a reference is removed.

At 304, a first reference from the first object to a second object (e.g., object B) is established. The reference can be strong or weak. If the reference is a strong reference, the strong reference count of the second object is incremented. Else, the strong reference count of the second object is unchanged.

At 306, a second reference from the second object to the first object is established. This reference is a weak reference. Accordingly, the strong reference count of the first object does not increase.

As described above, in some embodiments, to ensure that a strong-weak or a weak-weak reference pair is formed, 302-306 are performed in the same instruction or instruction sequence.

At 308, it is detected that the strong reference count of the first object has reached zero. In response, at 310, a corresponding action is invoked in response. In some embodiments, the action includes increasing the strong reference count of the first object so that the first object is preserved. In some embodiments, weak references to the object such as the weak reference from the second object to the first object are cleared using one or more techniques described above, and the first object is subsequently deallocated.

Figure 4:
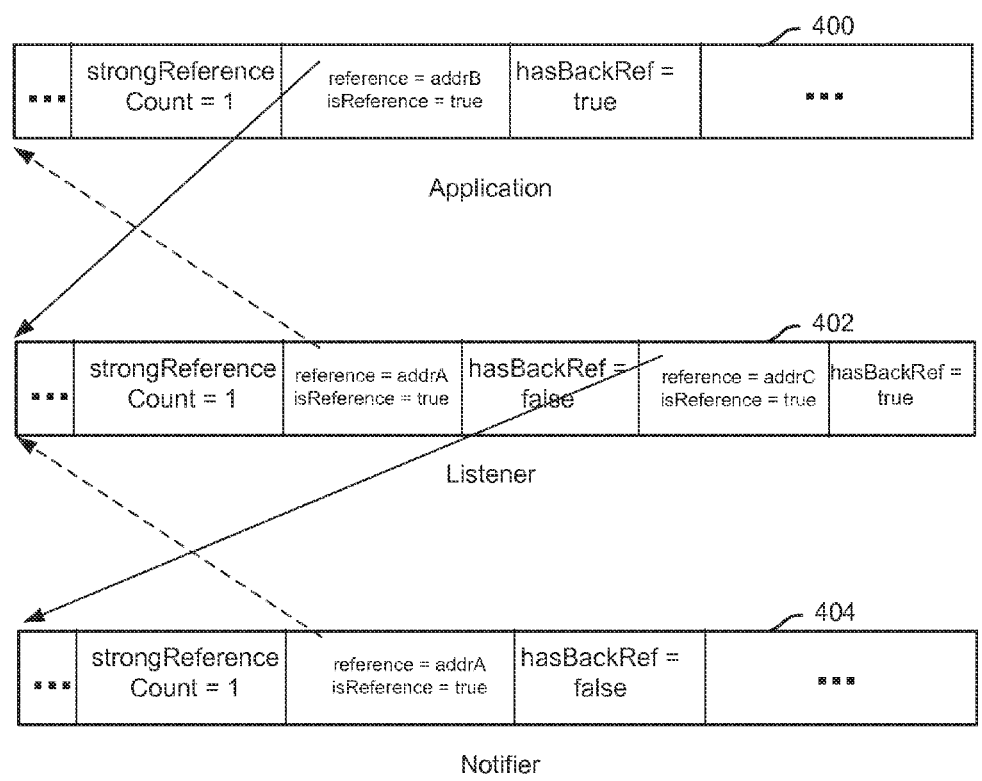
FIG. 4 is a diagram illustrating an embodiment of a listener-notifier implementation.

The data structures and processes supporting hardware-protected references as described above can be used in a variety of applications, such as a way to implement a listener-notifier pattern. FIG. 4 is a diagram illustrating an embodiment of a listener-notifier implementation. An application object 400 is interested in performing specific actions when certain events occur. It creates a listener object 402, which receives callbacks or notifications on these events from a notifier object 404 and optionally performs functions in response to the callbacks. Additional listener-notifier pairs may be included in other embodiments. To perform callback, the listener object and the notifier object need to have references to each other. In this example, the reference from the notifier to the listener is a weak reference, and the reference from the listener to the notifier is a reference (either strong or weak depending on application requirements) with associated hasBackRef field set to true. Similarly, the application object and the listener object also need to refer to each other so that the listener can be controlled by the application. In this example, the reference from the listener to the application is a weak reference, and the application to the listener is a reference (either strong or weak depending on application requirements) with hasBackRef set to true. A strong reference cycle is prevented from forming between the listener and the notifier and also between the application and the listener. In the example shown, the objects directly reference each other. In some embodiments, WRDs are used to allow indirect referencing between objects. In some embodiments, the listener object can be an extended WRD.

In some embodiments, a WRD that includes callback action can serve as a listener object. When an event such as a change to a notifier object occurs, the program code can iterate over the object's collection of weak references to WRDs. For each WRD, the callback action specified by the WRD is determined and invoked.

Figure 5:
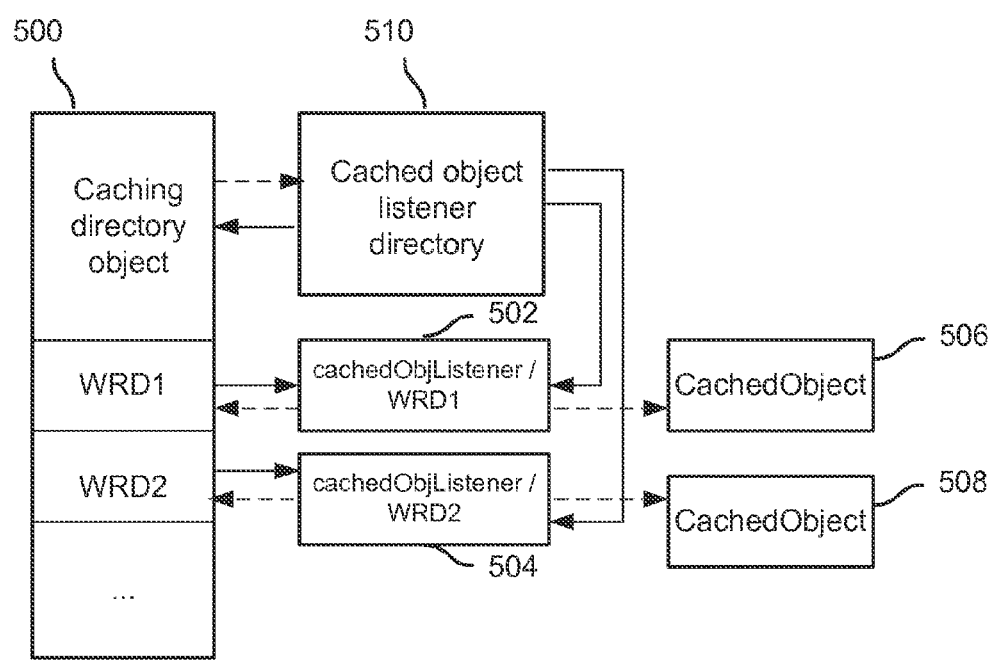
FIG. 5 is a diagram illustrating an embodiment of a cache directory implementation.

Another common pattern that can be implemented by hardware-protected references is the caching directory. FIG. 5 is a diagram illustrating an embodiment of a cache directory implementation. In this example, a caching directory is implemented using a caching directory object 500 comprising a collection of WRDs that are listener objects for cached objects such as 506 and 508. Thus, listener/WRD objects (502, 504, etc.) are also referred to as cachedObjListeners. WRD1, WRD2, etc provide an indirect reference from the caching directory object to each cached object. There is one cachedObjListener per cached object. Each cachedObjListener provides a weak reference to its corresponding cached object. There is also a listener directory, cachedObjListenerDir 510, that has a strong reference to each of these cachedObjListener objects and also acts as a listener to the caching directory object.

When a new cached object is introduced, the cachedObjListenerDir reacts by instantiating a corresponding cachedObjListener to provide a weak reference to this new cached object and adding this listener to its collection.

A cached object may have one or more strong references from an object that is external to the caching directory. If the external objects no longer reference the cached object and the number of strong references decreases to 0, the cachedObjListener causes the corresponding weak reference to this cached object to be deleted from the directory collection (thus decrementing the WRD's strongReferenceCount by 1), and causes this cachedObjListener to be deleted from the cachedObjListenerDir by removing the cachedObjListener's only remaining strong reference. Thus, this cachedObjListener is reclaimed.

When the caching directory is removed, the cachedObjListenerDir reacts by removing WRDs and the corresponding weak references from the WRDs, as well as the weak references from the WRD to the cached objects and the cached objects themselves.

Figure 6A:
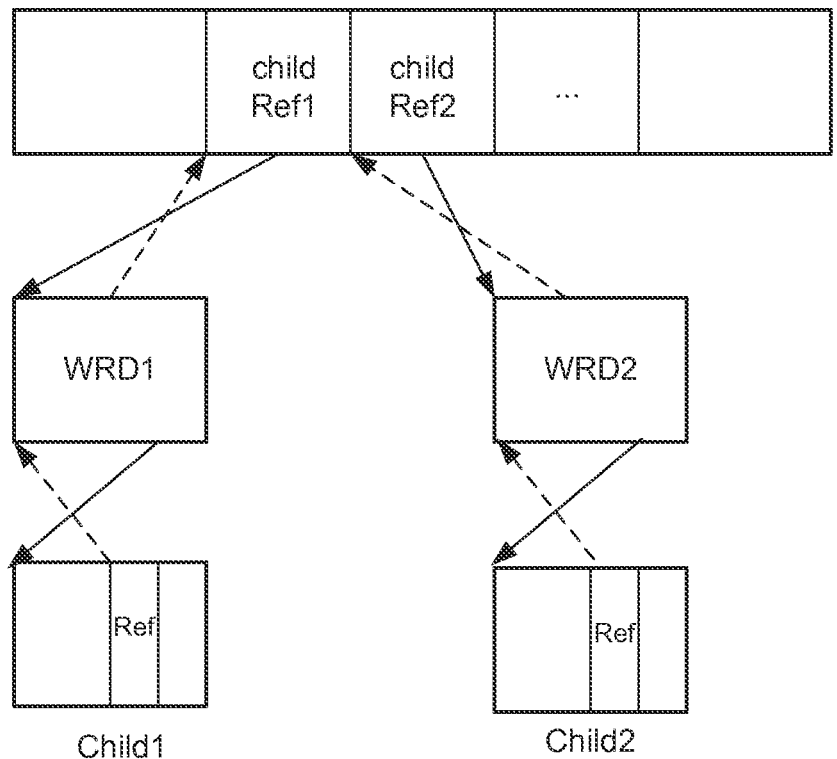
FIG. 6A is a data structure diagram illustrating an embodiment of a parent-child implementation using hardware-protected references.

Another common pattern often used in applications is the parent-child structure, in which a parent has a collection of references to child objects, and each child object has back references to the parent. FIG. 6A is a data structure diagram illustrating an embodiment of a parent-child implementation using hardware-protected references. In this implementation, parent object 500 includes a collection of references (childRef1, childRef2, etc.) to WRDs (WRD1, WRD2, etc.). Each WRD has a back (weak) reference to the parent object and a strong reference to corresponding child objects (child1, child2, etc.). Each child object has a weak reference to its corresponding WRD. Deleting a child reference from the collection in the parent causes the corresponding WRD to be dereferenced, which in turn causes the back reference from the child object to be cleared. For example, if childRef1 is to be deleted, WRD1's strongReferenceCount would decrease to 0, thus causing the weak reference from child1 to WRD1 to be cleared. If not referred to by any other object, child1 would be deleted once WRD1 is deleted.

Figure 6B:
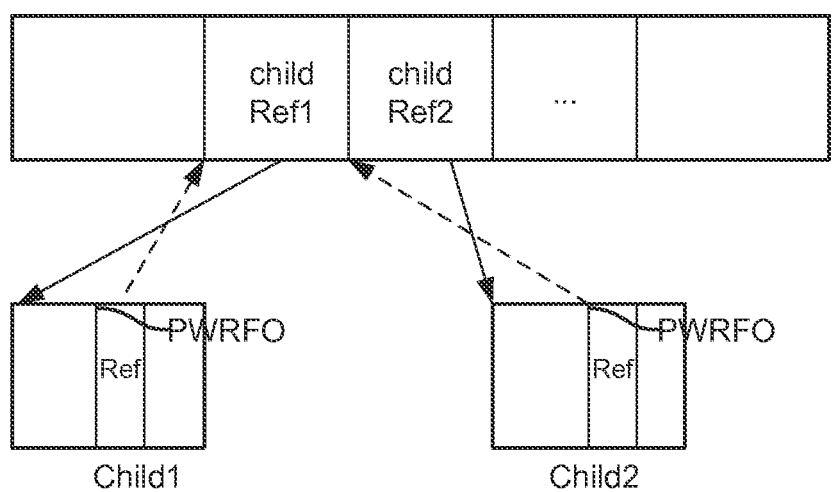
FIG. 6B is a data structure diagram illustrating another embodiment of a parent-child implementation using hardware-protected references.

FIG. 6B is a data structure diagram illustrating another embodiment of a parent-child implementation using hardware-protected references. This implementation is an improved parent-child structure. In this implementation, the offset of the back references from the child objects to the parent object (referred to as parent weak reference field offset or PWRFO) is at a preset location known to the hardware. In some embodiments, a special register is used to store the PWRFO. Further, each child object includes a hasParentWeakRef field that indicates whether the object is using a weak reference to the parent at that offset location. Each child object therefore has a direct weak back reference to the parent object, and no WRD is needed. When a child reference is deleted from the collection in the parent object, if the child reference has its hasBackRef set to true and refers to a child object with hasParentWeakRef also set to true, the field at PWRFO in the child object is cleared since it would point to the parent object. When a reference with hasBackRef set to true points to a child object with hasParentWeakRef also set to true, the field at PWRFO in the child object is set as a weak reference to the parent object. In some embodiments, when the object's hasParentWeakRef field is set to true, the hardware disallows direct software modifications to the field at PWRFO to ensure its integrity.

Returning to the cache directory example discussed above, in some cases, no additional processing on a cached object is required besides removing the object from cache directory when the strongReferenceCount reaches 0. Thus, the cache directory can be implemented using the parent-child structure, with the cache directory as the parent and cached objects as children. The parent object has weak references to the child cached objects, which also have weak references back to the parent. Stated another way, some cache directories can be implemented using a parent-child structure that supports weak-weak reference pairs instead of the WRD/listener structure previously described.

Another data pattern that can be implemented using hardware-protected references is structured memory. Structured memory is immutable, copy-on-write memory. In some embodiments of structured memory systems, memory is divided into segments allocated on arbitrary boundaries, such as a directed acyclic graph (DAG). Each segment has unique content that is immutable. A segment includes a plurality of memory cells that are basic units of the structured memory. Examples of systems supporting structured memory may be found in U.S. Pat. No. 7,650,460 entitled HIERARCHICAL IMMUTABLE CONTENT-ADDRESSABLE MEMORY PROCESSOR and co-pending U.S. patent application Ser. No. 12/784,268 entitled STRUCTURED MEMORY COPROCESSOR filed May 20, 2010, which are incorporated herein by reference for all purposes.

Figure 7:
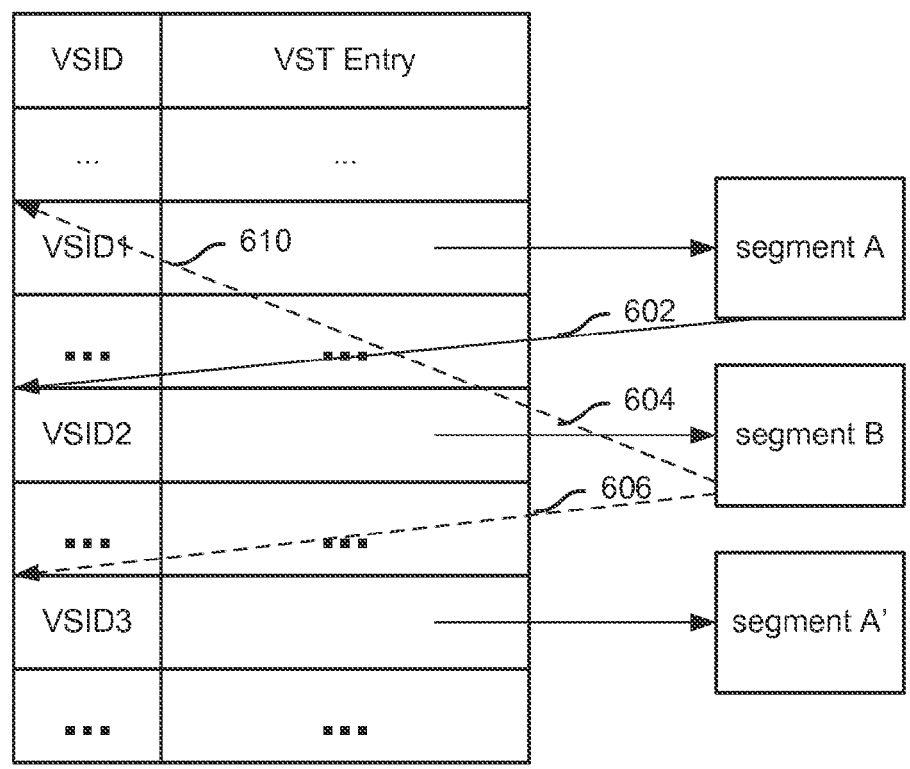
FIG. 7 is a data structure diagram illustrating an embodiment of a structured memory.

FIG. 7 is a data structure diagram illustrating an embodiment of a structured memory. In this example, memory is organized as a plurality of segments. Because the segments are unique and immutable, when the content of a segment is modified, any reference to the segment should be switched to a different segment with the modified content. Assuming that two segments A and B reference each other, ordinarily, whenever any content within A changes, A effectively becomes replaced by another segment A' that includes the changed content. Thus, the reference from B to A needs to be switched to referencing A', and the reference within A' should be set to reference B. Since such changes can be frequent and involves searching through the segments to locate A', direct referencing by two segments to each other can be inefficient. To solve this issue, in this example, a virtual segment table (VST) includes a plurality of entries that corresponds to the memory segments is used to locate the segments. A VST entry has the following format:

VstEntry {
  phyAddress
  level
  strongReferenceCount
  hasParentBackRef
  isWRD
  WRDList
}

In a VstEntry, the phyAddress field corresponds to the physical address of a segment object, the level field corresponds to the level of the segment object within the hierarchy of objects for purposes of preventing a strong-strong reference cycle from forming, the strongReferenceCount field tracks the number of strong references to this object, the hasParentBackRef field indicates whether the segment has a weak back reference to its parent, the isWRD field indicates whether the segment is used as a WRD as described above, and the WRDList is used to maintain the list of WRDs created in connection with this object. A segment that corresponds to a VST entry is identified using a virtual segment identifier (VSID) that serves as an index into the VST. In some embodiments, the VSID further encodes a isStrongReference field and a hasBackRef field as described in connection with the datum shown in FIG. 1A.

Accordingly, each VstEntry corresponds to a segment. For example, VSID1, VSID2, and VSID3 correspond to segments A, B, and A', respectively. Instead of referencing each other directly, segment A references the entry that corresponds to VSID2 which corresponds to segment B (as illustrated by arrow 602), and segment B references the entry that corresponds to VSID1 which corresponds to segment A (as illustrated by arrow 604). When segment A is modified, the replacement segment A' can be looked up in the table with relative ease using techniques such as ones described in U.S. Pat. No. 7,650,460 and co-pending U.S. patent application Ser. No. 12/784,268. Thus, only reference 604 needs to be switched to referencing the entry that corresponds to VSID3 (arrow 606), and the underlying object does not need to be modified. Through indirection via the VST, references by two segments to each other can be more efficiently managed. By using a VST, the reference counts are tracked at the VST Entry level instead of at cell level. The VST may be stored in a hardware memory separate from the memory storing the segment data.

Note that the references between the segments and VstEntries can be strong-weak or weak-weak depending on the requirements of the application, so long as they do not form a strong-strong cycle.

Memory management using hardware-protected references has been disclosed. By using weak references that do not increase reference count and preventing strong-strong reference cycles from forming, objects, including objects that reference each other, can be reclaimed based on reference count.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a set of one or more processors configured to:
  maintain a strong reference count for a first object;
  establish a first reference from the first object to a second object;
  establish a second reference from the second object to the first object, wherein establishing the second reference includes preventing the first and second references from both being strong references;
  wherein the first and second references comprise hardware-protected references;
  detect that the strong reference count of the first object has reached zero; and
  in response to detecting that the strong reference count has reached zero, invoke a corresponding action; and
  a memory coupled to the set of one or more processors and configured to provide the set of one or more processors with instructions.

2. The system of claim 1, wherein the first reference is a strong reference that increases the strong reference count of the second object.

3. The system of claim 1, wherein the first reference is a weak reference that does not increase the strong reference count of the second object.

4. The system of claim 1, wherein the action includes increasing the strong reference count of the first object.

5. The system of claim 1, wherein the second reference is a weak reference, and wherein the action includes clearing the weak reference and deallocating the first object.

6. The system of claim 1, wherein the first object includes a tag indicating whether the first reference is a reference or a value.

7. The system of claim 1, wherein the first object includes a tag indicating whether the first reference is a strong reference or a weak reference.

8. The system of claim 1, wherein at least one of the first reference and the second reference is a weak reference, and wherein the weak reference is established via a Weak Reference Descriptor (WRD).

9. The system of claim 8, wherein the WRD included in a first list of WRDs in the first object, and in a second list of WRDs in the second object.

10. The system of claim 8, wherein the WRD includes a callback action that is invoked when a notifying event occurs.

11. The system of claim 8, wherein the first object includes a reference to the WRD, and the second object includes a WRD list that includes a reference to the WRD.

12. The system of claim 8, wherein the WRD is a listener object in a caching directory.

13. The system of claim 1, wherein at least one of the first reference and the second reference is a weak reference, and wherein the location of the weak reference is indicated by an offset.

14. The system of claim 1, wherein at least one of the first reference and the second reference is a weak reference, and wherein the location of the weak reference is indicated by an offset that is stored in the WRD.

15. The system of claim 1, wherein the first object is a parent object and the second object is a child object.

16. The system of claim 15, wherein a parent weak reference field offset (PWRFO) is used to indicate an offset of the second reference in the child object.

17. The system of claim 1, wherein the first object is a virtual segment table (VST) entry used for indexing a plurality of content unique and immutable segments in a structured memory, and the second object is one of the plurality of segments.

18. The system of claim 1, wherein the set of one or more processors is further configured to set the first object to a first hierarchical level and set the second object to a second hierarchical level.

19. The system of claim 1, wherein the set of one or more processors is further configured to set the first object to a first hierarchical level and set the second object to a second hierarchical level, wherein the first hierarchical level is different from the second hierarchical level, and the first hierarchical level and the second hierarchical level are checked when storing the strong reference.

20. The system of claim 1, wherein the first object is a listener object and the second object is a notifier object.

21. The system of claim 1, wherein establishing the second reference includes checking the first reference, and in the event that the first reference is a strong reference, preventing the second reference from also being a strong reference at least in part by establishing the second reference as a weak reference.

22. A method, comprising:
  maintaining a strong reference count for a first object;
  establishing a first reference from the first object to a second object;
  establishing a second reference from the second object to the first object, wherein establishing the second reference includes preventing the first and second references from both being strong references;
  wherein the first and second references comprise hardware-protected references;
  detecting, using a set of one or more processors, that the strong reference count of the first object has reached zero; and
  in response to detecting that the strong reference count has reached zero, invoking a corresponding action.

23. A computer program product embodied in a non-transitory computer readable storage medium and comprising computer instructions for:
  maintaining a strong reference count for a first object;
  establishing a first reference from the first object to a second object;
  establishing a second reference from the second object to the first object, wherein establishing the second reference includes preventing the first and second references from both being strong references;
  wherein the first and second references comprise hardware-protected references;
  detecting, using a set of one or more processors, that the strong reference count of the first object has reached zero; and
  in response to detecting that the strong reference count has reached zero, invoking a corresponding action.

* * * * *